(12) United States Patent
Benjamin et al.

(10) Patent No.: US 9,573,313 B2
(45) Date of Patent: Feb. 21, 2017

(54) EXTRUDER SCREW SHAFT ALIGNMENT APPARATUS AND METHOD

(71) Applicant: Entek Manufacturing LLC, Lebanon, OR (US)

(72) Inventors: Craig Allen Benjamin, Lebanon, OR (US); Melissa Christine Jensen-Morgan, Lebanon, OR (US); Dean Justin Elliott, Albany, OR (US)

(73) Assignee: Entek Manufacturing LLC, Lebanon, OR (US)

( * ) Notice: Subject to any disclaimer, the term of this patent is extended or adjusted under 35 U.S.C. 154(b) by 0 days.

(21) Appl. No.: 14/419,737

(22) PCT Filed: Aug. 6, 2014

(86) PCT No.: PCT/US2014/049977
§ 371 (c)(1),
(2) Date: Feb. 5, 2015

(87) PCT Pub. No.: WO2016/022114
PCT Pub. Date: Feb. 11, 2016

(65) Prior Publication Data
US 2016/0257050 A1    Sep. 8, 2016

(51) Int. Cl.
*B29C 47/40*    (2006.01)
*B29C 47/60*    (2006.01)
*B29C 47/08*    (2006.01)

(52) U.S. Cl.
CPC ......... *B29C 47/402* (2013.01); *B29C 47/0801* (2013.01); *B29C 47/082* (2013.01);
(Continued)

(58) Field of Classification Search
CPC ............. B29C 47/0801; B29C 47/0803; B29C 47/0805; B29C 47/082; B29C 47/0825; B29C 47/0833; B29C 47/0844; B29C 47/40; B29C 47/402; B29C 47/60
See application file for complete search history.

(56) References Cited

U.S. PATENT DOCUMENTS 2,916,769 A    12/1959   Baigent
3,766,797 A *  10/1973   Hanslik ............... B29C 47/0801
                                                    74/410

(Continued)

*Primary Examiner* — Alison L Hindenlang
*Assistant Examiner* — Joseph Leyson
(74) *Attorney, Agent, or Firm* — Stoel Rives LLP

(57) ABSTRACT

Puck and collar alignment device embodiments facilitate simultaneous insertion of free end portions of screw shafts into open end portions of complementary drive couplings. The embodiments have alignment keys that correct deviations in alignment and rotation introduced while moving the screw shafts though a barrel of an extruder. Tapered front faces of the alignment keys incrementally adjust coaxial alignment, and tapered side faces of the alignment keys incrementally adjust rotational position cooperatively between the alignment devices and drive couplings. The coaxial and rotational position adjustments cooperate to simultaneously guide multiple alignment keys to fit within corresponding keyway sections while providing alignment of external splines on the screw shafts to interlock in a timed relationship with internal splines on the drive couplings during the simultaneous insertion.

24 Claims, 5 Drawing Sheets

(52) U.S. Cl.
CPC ...... *B29C 47/0803* (2013.01); *B29C 47/0805* (2013.01); *B29C 47/0825* (2013.01); *B29C 47/0833* (2013.01); *B29C 47/0844* (2013.01); *B29C 47/40* (2013.01); *B29C 47/60* (2013.01)

(56) References Cited

U.S. PATENT DOCUMENTS

| | | | |
|---|---|---|---|
| 3,824,875 A * | 7/1974 | Willert | B29C 47/0801 366/100 |
| 4,527,899 A | 7/1985 | Blach et al. | |
| 5,088,914 A * | 2/1992 | Brambilla | B29C 47/625 264/211.23 |
| 5,110,284 A | 5/1992 | Dienst et al. | |
| 5,750,158 A | 5/1998 | Wissmann et al. | |
| 5,993,186 A | 11/1999 | Floyd et al. | |
| 7,635,235 B2 | 12/2009 | Riehle | |
| 2003/0021860 A1 | 1/2003 | Clock et al. | |
| 2007/0117448 A1 | 5/2007 | Lazaro, Jr. et al. | |

* cited by examiner

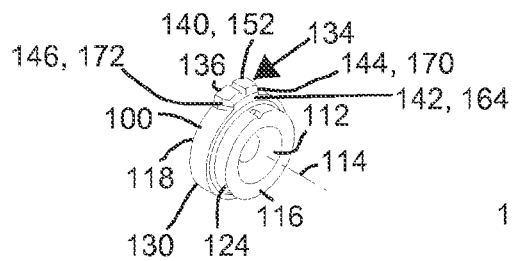
FIG. 6
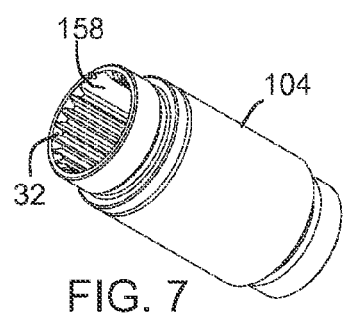
FIG. 7
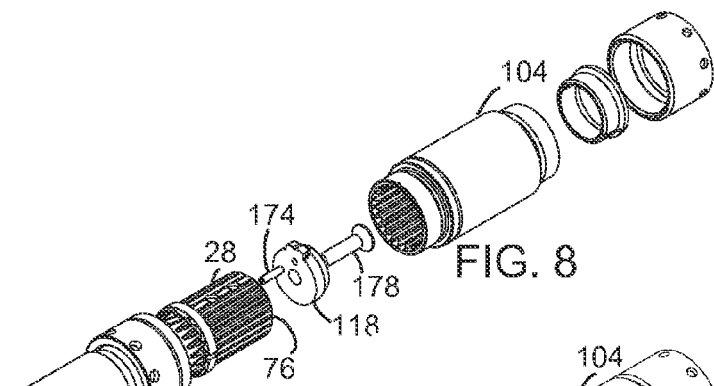
FIG. 8
FIG. 9
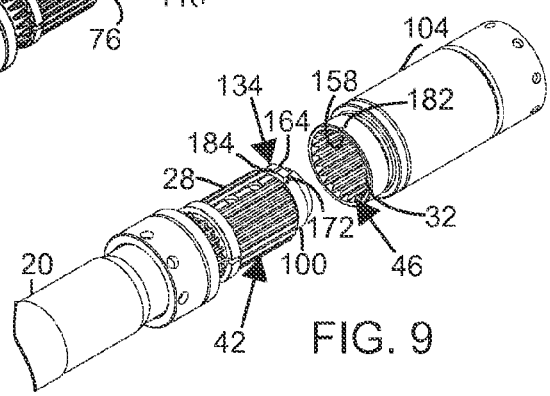
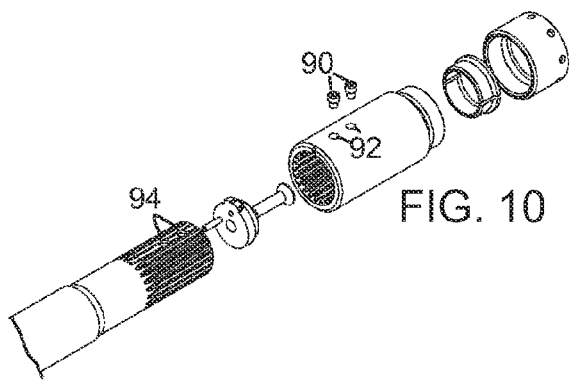
FIG. 10

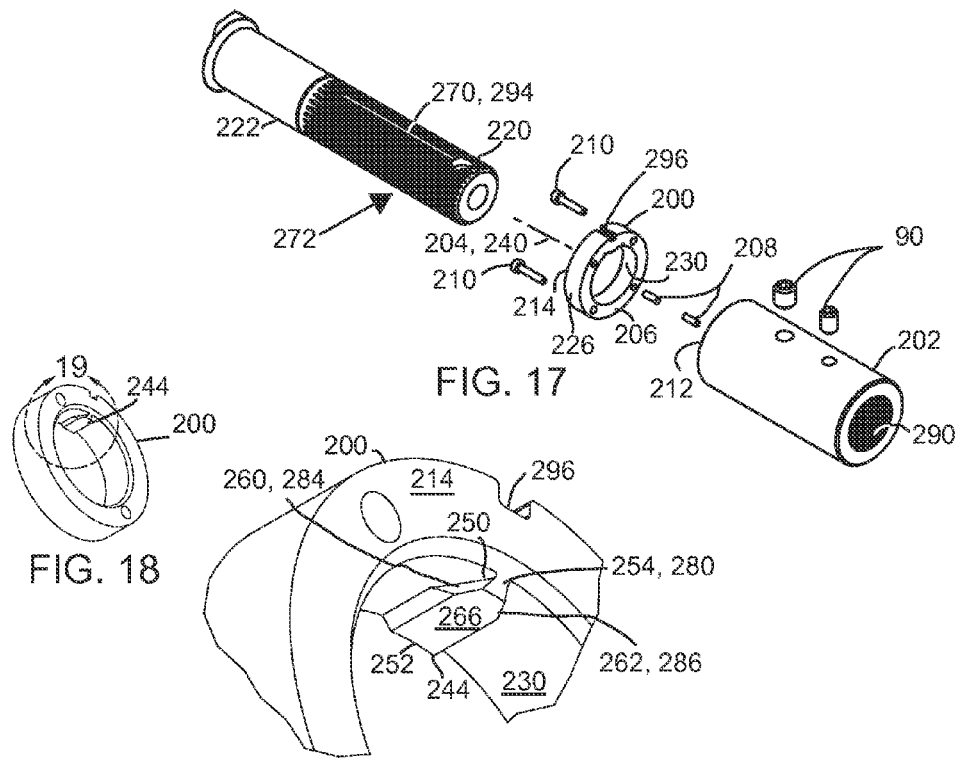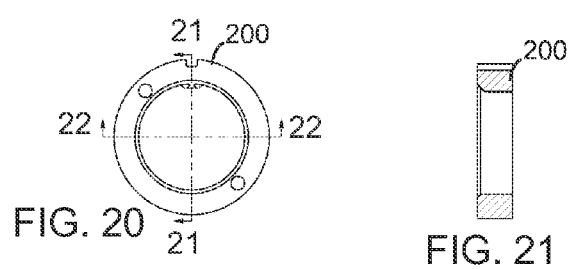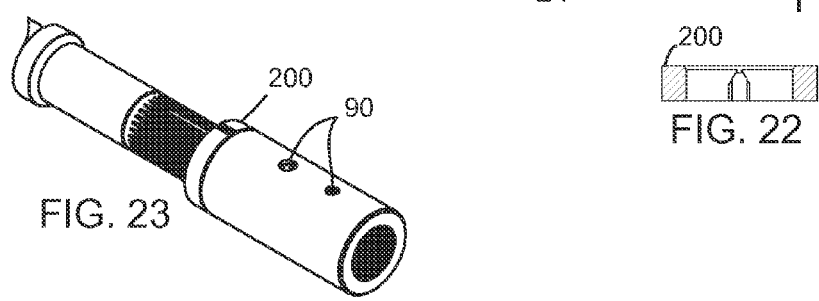

EXTRUDER SCREW SHAFT ALIGNMENT APPARATUS AND METHOD

COPYRIGHT NOTICE

© 2014 Entek Manufacturing LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This disclosure relates generally to installation of extruder screw shafts and, more particularly, to alignment devices that facilitate installation of extruder screw shafts into drive couplings attached to output shafts of a drive motor gearbox.

BACKGROUND INFORMATION

Output shafts of an extruder drive motor gearbox rotate according to a precise timing relative to each other. The precise timing is transferred to drive couplings attached to the output shafts, and then to screw shafts attached to the couplings, by tight fitting (precise tolerance) complementary splines. The complementary splines between the screw shafts and drive couplings interlock when free end portions of the screw shafts are inserted into open end portions of drive couplings at precise orientations. The precise orientations maintain the correct timing of intermeshing screws in an extruder barrel as the intermeshing screws rotate about longitudinal axes in response to drive motor force to apply shear forces to raw materials and thereby form a finished product.

SUMMARY OF THE DISCLOSURE

An alignment device according to a first embodiment includes an alignment puck having an apertured body that defines a central axis. The alignment puck includes a first end portion and a second end portion. The first end portion and the second end portion are configured to mate with, respectively, a drive coupling and a free end portion of a screw shaft. The first end portion includes a first circumferential exterior surface that is coaxially aligned with the central axis and is sized to fit within the screw shaft open end portion of the drive coupling. The second end portion includes a second circumferential exterior surface. The alignment puck has an alignment key that radially protrudes from the second circumferential exterior surface and includes a wedge-shaped body having a top portion, a front portion, and first and second axial side portions. The top portion has an arcuate surface of complementary shape to that of the interior of the screw shaft open end portion of the drive coupling. The top portion tapers toward the central axis of the apertured body and toward the front portion to define a tapered front face of the alignment key. The first and second axial side portions taper toward the first end portion and toward each other to define respective first and second tapered side faces of the alignment key. The tapering of the tapered front face and the tapering of the first and second tapered side faces provide guide surfaces that, as the screw shaft and drive coupling are moved relative to each other to cause screw shaft external splines and drive coupling internal splines to interlock, guide the alignment key to fit within a keyway section of the screw shaft open end portion while causing self-alignment of the external splines on the screw shaft to interlock in a timed relationship with the complementary internal splines of the drive coupling.

An alignment device according to a second embodiment includes an alignment collar defining a central axis. The alignment collar includes a first collar face that is configured to mate with a face of a drive coupling, a second collar face that is configured to receive a free end portion of a screw shaft, a circumferential exterior surface that is coaxially aligned with the central axis, and a circumferential interior surface that is coaxially aligned with the central axis and sized to receive the free end portion of the screw shaft in coaxial alignment with its longitudinal axis. The alignment collar has an alignment key that radially protrudes from the circumferential interior surface and includes a wedge-shaped body having an inwardly depending portion, a front portion, and first and second axial side portions. The inwardly depending portion has an arcuate surface of complementary shape to that of a keyway section of external splines of the free end portion of the screw shaft. The inwardly depending portion tapers toward the second collar face and toward the front portion to define a tapered front face of the alignment key. The first and second axial side portions taper toward the second collar face and toward each other to define respective first and second tapered side faces of the alignment key. The tapering of the tapered front face and the tapering of the first and second tapered side faces provide guide surfaces that, as the screw shaft and drive coupling are moved relative to each other to cause screw shaft external splines and drive coupling internal splines to interlock, guide the alignment key to fit within the keyway section while causing self-alignment of the external splines on the screw shaft to interlock in a timed relationship with the complementary internal splines of the drive coupling.

A method of inserting, in a multiple screw extruder, screw shafts of mutually spaced-apart intermeshing screws into complementary drive couplings on output shafts of a drive motor gearbox, entails causing the output shafts of the drive motor gearbox to rotate the drive coupling rotational position until a first fiducial indicates that the drive coupling rotational position is in a desired initial rotational position; setting the intermeshed screws to an initial insertion position at least partly external to the multiple screw extruder, the initial insertion position defined by the longitudinal axes of the screw shafts being in a nominal coaxial alignment with those of the drive couplings and by a second fiducial indicating the screw shafts are in a nominal rotational alignment with the desired initial rotational position; and simultaneously moving the intermeshed screws from the initial insertion position and though a barrel of the multiple screw extruder for simultaneous insertion of free end portions of the screw shafts into screw shaft open end portions, the moving through the barrel causing a deviation from the nominal coaxial and rotational alignments, and the simultaneous insertion causing correction of the deviation when the tapered front faces of the alignment keys incrementally adjust the nominal coaxial alignment and the tapered side faces of the alignment keys incrementally adjust the desired initial rotational position cooperatively to guide the alignment keys to fit within associated ones of the keyway sections while providing alignment of the external splines on the screw shaft to interlock in a timed relationship with the internal splines during the simultaneous insertion.

Additional aspects and advantages will be apparent from the following detailed description of preferred embodiments, which proceeds with reference to the accompanying drawings.

BRIEF DESCRIPTION OF THE DRAWINGS

FIG. 6 is an isometric view of an alignment device, according to an alignment puck embodiment, having an alignment key radially protruding from a circumferential exterior surface of the alignment device.

FIG. 7 is an isometric view of an open end portion of a drive coupling, showing a keyway section that is located between internal splines and is sized to receive the alignment key of FIG. 6.

FIG. 8 is a fragmentary exploded view, showing in operational alignment, of an extruder screw shaft free end portion, the alignment device of FIG. 6, alignment-device fastener components, a complementary drive coupling of FIG. 7, and drive coupling collet retainer components.

FIG. 9 is a fragmentary isometric view showing the FIG. 8 components after assembly and showing the alignment puck fastened to the free end portion of the extruder drive shaft and positioned for insertion into the drive coupling.

FIG. 10 is a fragmentary exploded view showing an alternative embodiment of a drive coupling that includes both set screw (at left, driven side) and collet split rings and nut (at right, driving side) retainer devices.

FIG. 17 is an exploded view showing a free end portion, a drive coupling having double set screw retention devices, and an alignment device and its fasteners, according to an alignment collar embodiment.

FIG. 18 is an isometric view of the alignment collar of FIG. 17.

FIG. 19 is an enlarged detail view of an area encompassed by line 19 of FIG. 18, showing a chamfered front face of the alignment collar and an alignment key radially protruding from a circumferential interior surface.

FIG. 20 is a front elevation view of the alignment collar of FIG. 17.

FIGS. 21 and 22 are section views taken along, respectively, line 21-21 and line 22-22 of FIG. 20.

FIG. 23 is an isometric view showing bolted together the alignment collar and the drive coupling of FIG. 17 and engaging a keyway section of the extruder screw shaft free end portion.

DETAILED DESCRIPTION OF EMBODIMENTS

Figure 1:
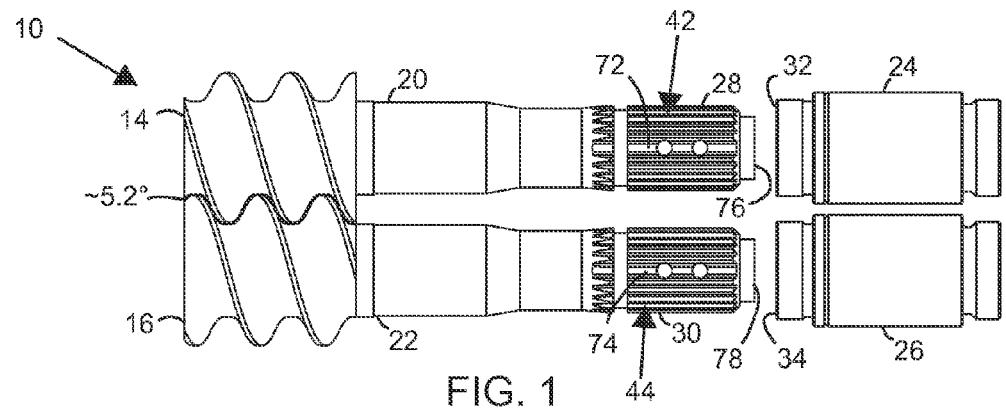
FIG. 1 is a top plan view of prior art extruder screw shafts having intermeshed screws and free end portions in nominal coaxial and rotational alignment with complementary drive couplings.
Figure 2:
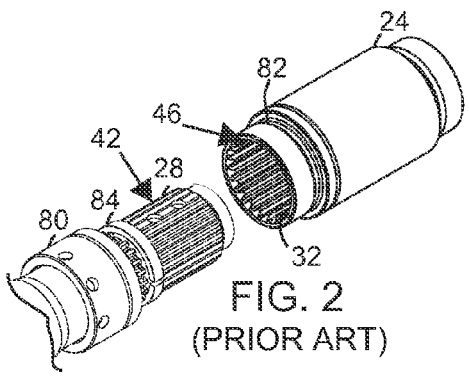
FIG. 2 is an isometric view showing internal splines of the upper prior art drive coupling of FIG. 1, and a fragment of a free end portion of the upper prior art extruder screw shaft, including a tightening nut, split ring, and external splines, of FIG. 1.
Figure 3:
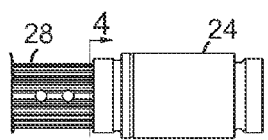
FIG. 3 is a top plan fragmentary view of the drive coupling and free end portion of the extruder screw shaft of FIG. 2, showing the extruder screw shaft moved along its longitudinal axis to confront an open end portion of the drive coupling during a conventional trial-and-error attempt to align the external splines with the internal splines and thereby establish a timed relationship between the extruder screw shafts.

FIG. 1 shows a conventional co-rotating twin-screw configuration 10 for an extruder 12 (FIG. 16) having intermeshing screws 14, 16 on multi-tooth involute-spline screw shafts 20, 22 coaxially aligned with complementary drive couplings 24, 26. In other embodiments, twin-screw configuration 10 may be counter rotating, or it may include three or more screws.

Figure 4:
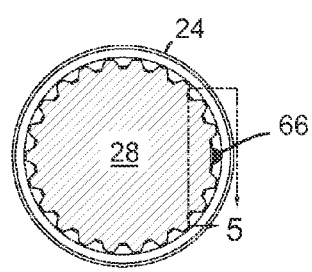
FIG. 4 is a sectional view taken along line 4-4 of FIG. 3.
Figure 5:
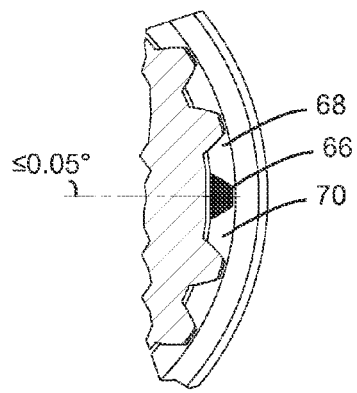
FIG. 5 is an enlarged detail view of an area encompassed by line 5 of FIG. 4, showing the precise orientation at which the external splines of the extruder screw shaft align and thereby mate with the internal splines of the drive coupling during the conventional alignment process.
Figure 16:
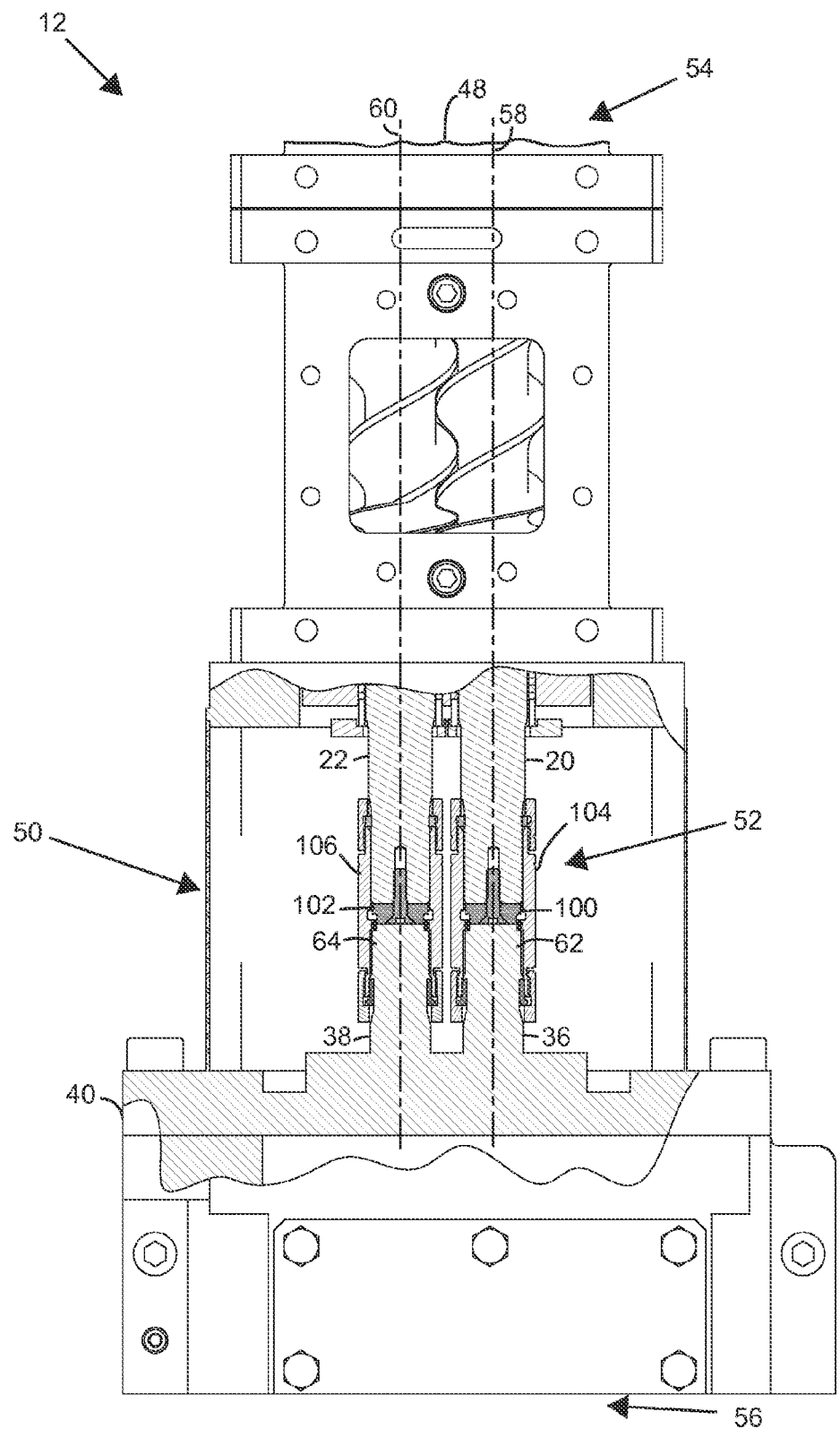
FIG. 16 is a top plan fragmentary view of a twin-screw, co-rotating extruder, with portions broken away to show alignment pucks of FIG. 6 having front faces seated against those of complementary output shafts of a drive motor gearbox.

FIGS. 1-5 are useful in describing difficulties inherent in conventional attempts to align and insert free end portions 28, 30 of screw shafts 20, 22 into open end portions 32, 34 of complementary drive couplings 24, 26 so as to couple screw shafts 20, 22 with output shafts 36, 38 (FIG. 16) of a drive motor gearbox 40 of extruder 12 (FIG. 16). Free end portions 28, 30 are shown positioned prior to (FIGS. 1 and 2) and during (FIGS. 3-5) insertion into drive couplings 24, 26, so that external splines 42, 44 of screw shafts 20, 22 interlock with internal spines 46 (FIG. 2) of drive couplings 24, 26. The interlocking is shown in FIG. 5, which depicts a precise degree of rotation (e.g., about 0.05 of a degree) at which splines are aligned before proper insertion is achieved with conventional insertion attempts. Intermeshed screws 14, 16 are, however, capable of about 5.2 degrees of rotation before contacting each other, so any slight rotation or coaxial offset introduced while moving (typically heavy) screw shafts 20, 22 through a barrel 48 (FIG. 16) of extruder 12 while attempting to insert free end portions 28, 30 into open end portions 32, 34 causes misalignment between external splines 42, 44 and internal spines 46.

Any misalignment usually takes anywhere from 10 to 45 minutes to overcome during a conventional installation process. The conventional installation process of precisely orienting screw shafts with drive couplings is time consuming and error prone because an extrusion machine typically has limited space for an installer to observe the alignment, there are few mechanical aids for achieving the alignment, tolerances between complementary splines are very small, and the adjustment mechanisms for adjusting alignment prior to insertion are located away from free end and open end portions and out of view of the installer.

Specifically, FIG. 16 depicts several factors that contribute to the difficulty of achieving the proper positioning during installation: a small user window can be opened so that a user may look and reach a hand into a working space 50 that is dark and awkward for hands and tools; a coupling location 52 is spaced far apart from adjustment locations 54, 56 so that a user cannot watch as screw shafts 20, 22 or output shafts 36, 38 are adjusted; and shafts and couplings longitudinal axes 58, 60 are not readily coaxially aligned due to the tendency of screw shafts 20, 22 to rest on the interior bottom surfaces of bores (not shown) formed in barrel 48.

The conventional process for inserting free end portions 28, 30 is generally relegated to highly skilled maintenance technicians. This is so because typical extruder operators frequently fail to achieve proper alignment and may inadvertently damage equipment while attempting the conventional process, which includes ten steps described as follows.

First, drive couplings 24, 26 are loosely installed on drive ends, such as distal ends 62, 64, of output shafts 36, 38. The loose installation allows a drive coupling to move axially along a longitudinal axis of an output shaft while still being interlocked with external driving spline teeth (not shown) around outer circumferences of distal ends 62, 64. The driving spline teeth are precisely oriented and matable with internal splines 46 (FIG. 2) of drive couplings 24, 26, to provide a timed relationship for screws shafts 20, 22. Such a timed relationship allows flights of screw 14 to freely pass through channels of a neighboring screw 16 (and vice versa) while screws 14, 16 rotate to apply shear forces to raw materials and thereby form a finished product.

A timed relationship is a function of the relationship between the number and rotational orientation of spline teeth among output shafts, their drive couplings, and screw shafts. For example, in some embodiments, output shaft 36 has a number of splines that is different from that of output shaft 38. Also, in some embodiments, each one of drive couplings 24, 26 has a different spline configuration between its screw shaft and output shaft ends, i.e., it has a different number of spline teeth at each end. According to some embodiments, the different number of spline teeth provide for various indexing positions, described as follows.

To establish a timed relationship, there is a removed spline tooth (not shown), on each of output shafts 36, 38. The removed tooth indicates the rotational position at which drive couplings 24, 26 are to be installed on output shafts 36, 38. The removed spline tooth (or other spline gap) is sized so that upon installation of drive couplings 24, 26 on output shafts 36, 38, its adjacent external spline teeth confront internal spline teeth adjacent a small internal spot weld located in a spline gap between the adjacent internal spline teeth of a drive coupling. Accordingly, the rotational position at which drive couplings 24, 26 are installed on output shafts 36, 38 is determined by the location of the rotational position (or so-called index position) of a spot weld. For example, FIGS. 4 and 5 show a spot weld 66 between two adjacent internal spline teeth 68, 70, (Spot weld 66 is actually located at the screw shaft end of drive coupling 24, but it is analogous to one located at the output shaft end, and, therefore, the balance of this paragraph is relevant to both screw shaft and output shaft ends of drive couplings.) The index position of spot weld 66 between internal splines 68, 70 is preconfigured so that spot weld 66 is slidingly engaged by a removed spline tooth according to a predetermined index position that is selected to maintain the desired timed relationship when internal and external splines are interlocking. Spot welds at the output shaft ends also allow drive couplings 24, 26 to axially slide onto distal ends 62, 64 while maintaining the desired timed relationship for output shafts 36, 38 during installation of screw shafts 20, 22.

Second, at least partly external to extruder 12, screws 14, 16 are installed on screw shafts 20, 22. Screws 14 and 16 are intermeshed.

Third, rotational positions of screw shafts 20, 22 are checked to determine whether these positions nominally match those of drive couplings 24, 26. The positions are typically checked using a shaft-timing fixture, which is sometimes referred to as an eyeglass wrench. The fixture mimics drive coupling internal geometry by having teeth at locations corresponding to internal splines of drive couplings. For example, each one of free end portions 28, 30 has an elongated removed tooth section 72, 74 between adjacent external splines 42, 44. Removed tooth sections 72, 74 are configured to precisely fit around internal spot welds (e.g., weld 66) on corresponding drive couplings 24, 26 at one rotational position when free end portions 28, 30 are correctly aligned and inserted into open end portions 32, 34. Accordingly, in one embodiment, the fixture has one wide tooth for each removed tooth section 72, 74 so that the widely spaced teeth mimic spot welds and indicate desired rotational positions of removed teeth sections 72, 74. Thus, screw shafts 20, 22 are rotated so that the widely spaced teeth fit within removed teeth sections 72, 74. While outside of extruder 12, the shaft-timing fixture is temporarily slid onto free end portions 28, 30 to check the positioning of screw shafts 20, 22 prior to their installation.

Fourth, screw shafts 20, 22 are moved so that front faces 76, 78 of free end portions 28, 30 are flush (i.e., coplanar) with each other. An installer typically uses a straight edge (not shown) to check whether free end portions 28 and 30 are coplanar. The installer holds the straight edge parallel to the face of one shaft, and then compares it to the face of a neighboring shaft. If front faces 76, 78 are flush, the installer can slide the straight edge into position against front face 76, while maintaining contact with front face 78. If front faces 76, 78 are not aligned, then either the straight edge will not slide into position, or there will be a gap between front face 78 and the straight edge.

Fifth, drive couplings 24, 26, now on output shafts 36, 38, are positioned so welds (e.g., weld 66) match the rotational orientation of screw shafts 20, 22. This rotational positioning can be achieved by slowly rotating at location 56 an input shaft (not shown) of drive motor gearbox 40 until the desired initial rotational position of output shafts 36, 38 is achieved. This slow rotation is usually manually done by the installer. Location 56 may be from one foot (30.5 cm) to six feet (1.83 m) away from location 52, which is usually not within view or reach of drive couplings 24, 26. In some embodiments, there are faint welding marks on the outside of drive couplings 24, 26 that show timing points, but internal splines 46 are not visible by an installer or a maintenance person viewing drive couplings 24, 26 located in working space 50.

Sixth, screw shafts 20, 22 are inserted into barrel 48. As they slide the length of barrel 48 (e.g., from five to thirty feet, depending on the extruder barrel length), screw shafts 20, 22 deviate from the nominal coaxial and rotational alignment. This deviation happens even when screw shafts 20, 22 are carefully moved through the bores in barrel 48. Consequently, it is unlikely that screw shafts 20, 22 remain in the timed relationship after sliding them through barrel 48.

Optionally, once screw shafts 20, 22 are slid into extruder 12, if a collet-style coupling is going to be used for screw shafts 20, 22, then a coupling nut 80 (FIG. 2) is installed onto each one of screw shafts 20, 22. Nut 80 is installed before a screw shaft is inserted in a coupling because nut 80 cannot be installed afterward.

Seventh, when front faces 76, 78 are near open end portions 32, 34, e.g., within about 0.25 of an inch (6.35 mm), the rotational orientations of screw shafts 20, 22 are compared those of drive couplings 24, 26. If the timing is off, screw shafts 20, 22 are manually rotated about their longitudinal axes 58, 60 while they are still inside barrel 48. This rotation is accomplished at location 54 by an installer using a wrench on screw ends of screw shafts 20, 22. For example, typically screw segments are held onto screw shafts using screw tips having flat sections that allow use of a wrench for manual rotation. Such manual rotation is laborious and imprecise, and it is not within visual range of location 52.

Eighth, drive couplings 24, 26 are readjusted by rotating them at location 56 so that the rotational positions of drive couplings 24, 26 match those of free end portions 28, 30. An installer typically manually performs this at location 56.

Ninth, using a combination of steps seven and eight, the capture of free end portions 28, 30 in drive couplings 24, 26 is accomplished. For example, a common method entails sliding one drive coupling towards its screw shaft and then making small adjustments to the rotation of the coupling by turning the input shaft at location 56. After a first screw shaft is captured in its coupling, the same trial-and-error process is used to capture a second screw shaft in its coupling.

Time spent on this procedure can be reduced if two installers are involved. One person can be at the couplings while the other person is at an adjustment location. The person at the couplings can test for linear resistance and communicate with the second person about the direction (clockwise or counterclockwise) and amount of desired rotational adjustment.

Tenth, once screw shafts 20, 22 are slid into position in drive couplings 24, 26 and front faces 76, 78 contact those of output shafts 36, 38, coupling retention mechanisms are fastened. For each coupling, there is a first retaining feature for an output shaft side of the coupling, and second retaining feature on a screw shaft side of the coupling. For example, upon insertion of free end portions 28, 30 into open end portions 32, 34, drive couplings 24, 26 are fastened (FIG. 2) by tightening nuts 80 onto coupling threads 82 and against split rings 84 or by inserting (FIGS. 10 and 23) set screws 90 through bores 92 and into screw holes 94. Some couplings use double collet retainers (FIGS. 1-3, 7-9, 11, 12, and 16), others have a combination of collet and set screw retainers (FIG. 10), and some others use double set screw retainers (FIGS. 17 and 23).

FIGS. 6-16 show an alignment device in the form of an alignment puck 100 that streamlines the foregoing conventional ten-step process. Alignment puck 100 has angled and chamfered surfaces that form a wedge to encourage self-alignment of free end portions with drive couplings, and vice versa, so that if the matable components are initially out of alignment, they can readily self-align and can be inserted without conventional manual adjustment by a person performing the installation. A simplified installation process using alignment pucks 100, 102 (FIGS. 11 and 16) for installing screw shafts 20, 22 into drive couplings 104, 106 is as follows.

First, alignment pucks 100, 102 are fastened onto free end portions 28, 30 of screw shafts 20, 22. Fastening components are shown in FIG. 8 and described below, but initially, FIGS. 6 and 7 show and the following describes details of alignment puck 100 and drive coupling 104.

Alignment puck 100 has an apertured body 112 defining a central axis 114 and including a first end portion 116 and a second end portion 118 that are configured to mate with, respectively, drive coupling 104 and free end portion 28 of screw shaft 20. First end portion 116 includes a first circumferential exterior surface 124 coaxially aligned with central axis 114 and sized to fit within open end portion 32 of drive coupling 104, and second end portion 118 includes a second circumferential exterior surface 130. An alignment key 134 radially protrudes from second circumferential exterior surface 130 and includes a wedge-shaped body 136 having a top portion 140, a front portion 142, and first and second axial side portions 144, 146. Top portion 140 has an arcuate surface 152 of complementary shape to that of the interior of open end portion 32 of drive coupling 104 (see e.g., FIGS. 14 and 15). For example, drive coupling 104 has a removed tooth providing a keyway section 158 for alignment key 134. Top portion 140 tapers toward central axis 114 and toward front portion 142 to define a tapered front face 164 of alignment key 134. First and second axial side portions 144, 146 taper toward first end portion 116 and toward each other to define respective first and second tapered side faces 170, 172 of alignment key 134. Alternative embodiments may include rounded guide surfaces, beveled surfaces, or chamfered surfaces.

As shown in FIG. 8, a spring pin (or dowel) 174 is inserted into bores (not shown) on front face 76 and second end portion 118 so that alignment puck 100 is maintained at a desired rotational position when attaching it to front face 76. A retaining bolt 178 is then placed through apertured body 112 to fasten alignment puck 100 to front face 76.

Second, drive couplings 104, 106 are loosely installed onto output shafts 36, 38. As described previously for the foregoing conventional process, the intent of this step is for a drive coupling to interlock with the external driving splines on an output shaft, but still being able to move axially along the axis of the output shaft.

Third, extruder screws 14, 16 are intermeshed at least partly external to extruder 12. This step is similar to the second step of the foregoing conventional process.

Fourth, drive couplings 104, 106 are positioned by a person positioned at location 56 so that fiducials (e.g., reference mark 182, FIG. 9), are located at desired rotational positions, such as a two o'clock position (as viewed from location 50 looking at output shafts 36, 38). Reference mark 182 in drive coupling is a notch that can be painted. The notch, therefore, inhibits normal wear from removing the paint.

Figure 11:
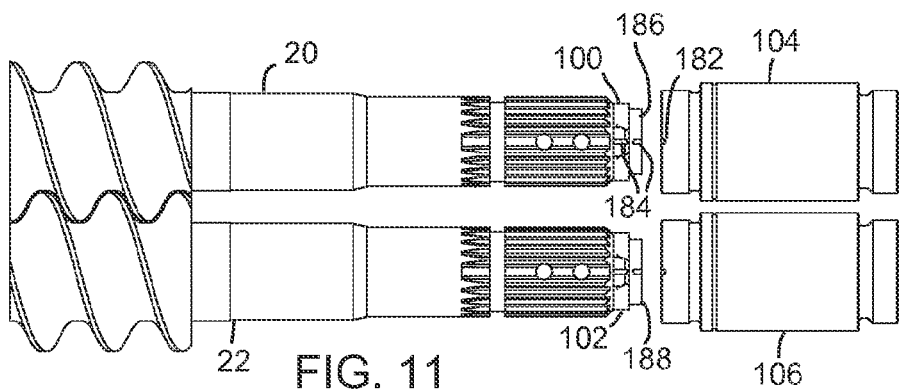
FIG. 11 is a top plan view of extruder screw shafts with their screws intermeshed and their free end portions carrying the alignment puck of FIG. 6 and positioned in nominal coaxial and rotational alignment with complementary drive couplings of FIG. 7.
Figure 12:
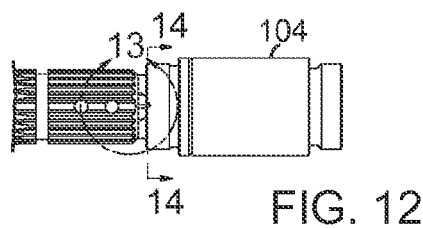
FIG. 12 is a top plan fragmentary view of the drive coupling and the free end portion of the extruder shaft of FIG. 11, showing the extruder screw shaft moved along its longitudinal axis to confront the open end portion of the drive coupling so that the alignment key will engage the keyway section and self-align the extruder screw shaft by moving it into the timed relationship.
Figure 13:
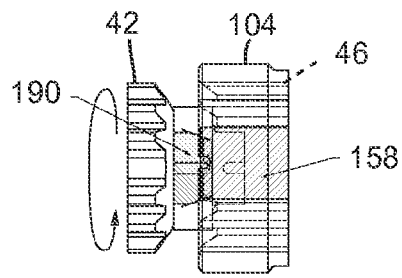
FIG. 13 is a detail view of an area encompassed by line 13 of FIG. 12, showing tapered faces of the alignment key slidably engaging the keyway section of the drive coupling to impart translational and rotational motion to the screw shafts and thereby self-align them with the drive couplings.

Fifth, the timing between screw shafts 20, 22 is checked. A shaft-timing fixture need not be used for checking the timing because the nominal timing does not need to be so precise as it does in the conventional process. Accordingly, fiducials (e.g., reference mark 184, FIG. 9) on alignment pucks 100, 102 provide a visual indication of whether the nominal rotational positions correspond to those of fiducials on drive couplings. For example, FIG. 11 shows fiducials 182, 184 are in the proper alignment.

Sixth, a straight edge is used to check whether front faces 186, 188 (FIG. 11) of alignment pucks 100, 102 are flush with each other.

Seventh, screw shafts 20, 22 are inserted into barrel 48, while care is taken to maintain the orientation of screws 14, 16 as they slide into barrel 48. As noted previously, a coupling nut is optionally installed on screw shafts 20, 22 once they are slid into extruder 12. When front faces 186, 188 reach open end portions 32, 34, as shown in FIGS. 12-15, axial force is applied to screw shafts 20, 22 so that alignment keys engage keyway sections of drive couplings. For example, tapering of tapered front face 164 and tapering of first and second tapered side faces 170, 172 provide guide surfaces 190 (shown in hatching, FIG. 13) that—as screw shaft 20 and drive coupling 104 are moved relative to each other to cause external splines 42 and internal splines 46 to interlock—guide alignment key 134 to fit within keyway section 158 (shown in hatching of FIG. 13) while causing self-alignment of external splines 42 to interlock in the timed relationship with complementary internal splines 46.

Figure 14:
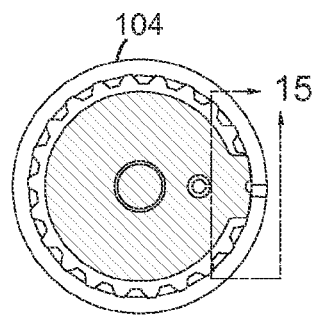
FIG. 14 is a sectional view taken along line 14-14 of FIG. 12.
Figure 15:
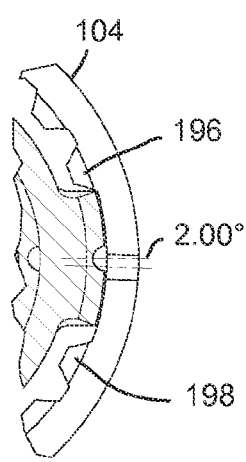
FIG. 15 is an enlarged detail view of an area encompassed by line 15 of FIG. 14, showing the alignment key engaging the keyway section by imparting rotational motion to the screw shaft relative to the drive coupling.

FIGS. 14 and 15 show that alignment key 134 and keyway section 158 provide about 2.00 degrees of rotational adjustment. Skilled persons will recognize, however, that the amount of rotational adjustment depends on widths of second tapered side faces 170, 172 and keyway section 158. For example, assuming that keyway section 158 has a width equal to one spline gap of a 24-spline drive coupling, then the maximum clockwise (or counterclockwise) rotational adjustment is 7.5 degrees (360 degrees, divided by 24 spline teeth, divided by two), which is one-half the included angle between splines 196, 198.

Another visual feature (i.e., a fiducial) may be included on screw shafts 20, 22 to indicate that they are inserted into drive couplings 24, 26 to a desired depth. This desired depth is the point at which faces 186, 188 of alignment pucks 100, 102 contact those of output shafts 36, 38, as shown in FIG. 16. Faces 186, 188 extend equal with or past a head surface (not shown) of bolt 178 so that they can transfer axial force to a thrust bearing (not shown) during operation of extruder 12. The material of a component containing the alignment feature can be optimized for wear, machinability, or other optimizations.

Eighth, coupling retaining mechanism are fastened once screw shafts 20, 22 are slid into position in drive couplings 104, 106 and faces 186, 188 are contacting those of output shafts 36, 38.

Skilled persons will recognize that one or more of the aforementioned steps may be performed in a different sequence from the one set forth. Likewise, one or more steps may be skipped in certain embodiments. For example, an alignment feature may be a machined feature of a screw shaft or of a drive coupling.

FIGS. 17-23 show a second embodiment of alignment device in the form of an alignment collar 200 that is fastened to a drive coupling 202. FIG. 17 shows alignment collar 200 defines a central axis 204, and includes a first collar face 206 that is configured to mate with (e.g., pin 208 and bolt 210 to) a face 212 of drive coupling 202. A second collar face 214 is configured to receive a free end portion 220 of a screw shaft 222. A circumferential exterior surface 226 is coaxially aligned with central axis 204. A circumferential interior surface 230 is coaxially aligned with central axis 204 and sized to receive free end portion 220 in coaxial alignment with its longitudinal axis 240.

FIGS. 18 and 19 show that alignment collar 200 has an alignment key 244 radially protruding from interior surface 230. Alignment key 244 includes a wedge-shaped body 250 having an inwardly depending portion 252, a front portion 254, and first and second axial side portions 260, 262. Inwardly depending portion 252 has an arcuate surface 266 of complementary shape to that of a keyway section 270 (FIG. 17) of external splines 272 (FIG. 17). Inwardly depending portion 252 tapers toward second collar face 214 and toward front portion 254 to define a tapered front face 280 of alignment key 244. First and second axial side portions 260, 262 taper toward second collar face 214 and toward each other to define respective first and second tapered side faces 284, 286 of alignment key 244.

The tapering of tapered front face 280 and the tapering of first and second tapered side faces 284, 286 provide guide surfaces that, as screw shaft 220 and drive coupling 202 are moved relative to each other to cause external splines 272 and internal splines 290 (FIG. 17) to interlock, guide alignment key 244 to fit within keyway section 270 while causing self-alignment of external splines 272 to interlock in the timed relationship with complementary internal splines. For example, chamfering of tapered front face 280 facilitates axial alignment of screw shaft 222 being inserted through collar 200, whereas chamfering of tapered side faces 284, 286 adjusts rotational alignment.

Notably, collar 200 functions in a similar manner as described previously with respect to alignment pucks 100, 102, but collar 200 is attached to a coupling instead of a free end portion. Thus, keyway section 270 is a removed spline, which also serves as a fiducial 294 for checking the timing alignment based on a rotational position of a fiducial 296 of alignment key 244.

It will be understood by skilled persons that many changes may be made to the details of the above-described embodiments without departing from the underlying principles of the invention. The scope of the present invention should, therefore, be determined only by the following claims.

The invention claimed is:

1. In a multiple screw extruder, in which multiple, mutually spaced-apart intermeshing screws rotate about longitudinal axes in response to drive motor force to apply shear forces to raw materials and thereby form a finished product, each of the intermeshing screws including a screw shaft having external splines and a free end portion, and the external splines of each screw shaft being angularly spaced apart around the longitudinal axis to interlock with, at locations proximal to the free end portion of the screw shaft, complementary internal splines in an interior of a drive coupling having a screw shaft open end portion for operatively coupling, in a timed relationship, the screw shaft to a drive motor gearbox shaft that provides the drive motor force to rotate the screw shaft, the improvement comprising:

an alignment puck having an apertured body defining a central axis and including a first end portion and a second end portion that are configured to mate with, respectively, the drive coupling and the free end portion of the screw shaft, the first end portion including a first circumferential exterior surface coaxially aligned with the central axis and sized to fit within the screw shaft open end portion of the drive coupling, and the second end portion including a second circumferential exterior surface; and an alignment key radially protruding from the second circumferential exterior surface and including a wedge-shaped body having a top portion, a front portion, and first and second axial side portions, the top portion having an arcuate surface of complementary shape to that of the interior of the screw shaft open end portion of the drive coupling, the top portion tapering toward the central axis of the apertured body and toward the front portion to define a tapered front face of the alignment key, and the first and second axial side portions tapering toward the first end portion and toward each other to define respective first and second tapered side faces of the alignment key, the tapering of the tapered front face and the tapering of the first and second tapered side faces providing guide surfaces that, as the screw shaft and drive coupling are moved relative to each other to cause the external splines and internal splines to interlock, guide the alignment key to fit within a keyway section of the screw shaft open end portion while causing self-alignment of the external splines on the screw shaft to interlock in the timed relationship with the complementary internal splines of the drive coupling.

2. The improvement of claim 1, in which a chamfer defines the tapering of the tapered front face.

3. The improvement of claim 1, in which first and second chamfers define the tapering of the respective first and second tapered side faces to impart rotational alignment of the screw shaft as it and the drive coupling are moved relative to each other.

4. The improvement of claim 1, in which the alignment puck has an exterior surface; and further comprising:
   a first fiducial located in or on a portion of the exterior surface of the alignment puck; and
   a second fiducial located in or on a portion of the keyway section.

5. The improvement of claim 1, in which a radius defined by the first circumferential exterior surface is less than a radius defined by the second circumferential exterior surface.

6. The improvement of claim 1, further comprising a circular recess in a face of the first end portion of the alignment puck, the circular recess sized to receive a fastener for attaching the alignment puck to the free end portion of the screw shaft.

7. The improvement of claim 1, in which the first end portion of the alignment puck has a face that abuts the drive motor gearbox shaft when the free end portion of the screw shaft is positioned inside the open end portion of the drive coupling.

8. The improvement of claim 1, in which tile alignment puck further comprises:
   a bore in a face of the second end portion of tile alignment puck, the bore sized to receive a fastener for mating the alignment puck in a predefined orientation with a face of the free end portion.

9. In a multiple screw extruder, in which multiple, mutually spaced-apart intermeshing screws rotate about longitudinal axes in response to drive motor force to apply shear forces to raw materials and thereby form a finished product, each of the intermeshing screws including a screw shaft having external splines and a free end portion, and the external splines of each screw shaft being angularly spaced apart around the longitudinal axis to interlock with, at locations proximal to the free end portion of the screw shaft, complementary internal splines in an interior of a drive coupling having a screw shaft open end portion for operatively coupling, in a timed relationship, the screw shaft to a drive motor gearbox shaft that provides the drive motor force to rotate the screw shaft, the improvement comprising:
   an alignment collar defining a central axis, the alignment collar including a first collar face that is configured to mate with a face of the drive coupling, a second collar face that is configured to receive the free end portion of the screw shaft, a circumferential exterior surface coaxially aligned with the central axis, and a circumferential interior surface coaxially aligned with the central axis and sized to receive the free end portion of the screw shaft in coaxial alignment with its longitudinal axis; and
   an alignment key radially protruding from the circumferential interior surface and including a wedge-shaped body having an inwardly depending portion, a front portion, and first and second axial side portions, the inwardly depending portion having an arcuate surface of complementary shape to that of a keyway section of the external splines of the free end portion of the screw shaft, the inwardly depending portion tapering toward the second collar face and toward the front portion to define a tapered front face of the alignment key, and the first and second axial side portions tapering toward the second collar face and toward each other to define respective first and second tapered side faces of the alignment key, the tapering of the tapered front face and the tapering of the first and second tapered side faces providing guide surfaces that, as the screw shaft and drive coupling are moved relative to each other to cause the external splines and internal splines to interlock, guide the alignment key to fit within the keyway section while causing self-alignment of the external splines on the screw shaft to interlock in the timed relationship with the complementary internal splines of the drive coupling.

10. The improvement of claim 9, in which the alignment collar further comprises a chamfer annular surface between the second collar face and the circumferential interior surface.

11. The improvement of claim 9, in which the alignment collar further comprises:
    a fiducial located in or on a portion of the circumferential exterior surface and opposing a location of the alignment key, the fiducial defining an alignment marker for visual alignment of the keyway section with the alignment key.

12. The improvement of claim 9, in which the alignment collar further comprises:
    a bore in the first collar face, the bore sized to receive a fastener for mating the alignment collar in a predefined orientation with the face of the drive coupling.

13. The improvement of claim 9, in which the alignment collar further comprises:
    a body; and
    an opening through the body, the opening sized to receive a fastener for fastening the alignment collar to the face of the drive coupling.

14. The improvement of claim 9, in which the alignment collar is ring shaped.

15. The improvement of claim 9, in which the alignment collar is in the shape of a partial ring.

16. A method of inserting, in a multiple screw extruder, screw shafts of mutually spaced-apart intermeshing screws into complementary drive couplings on output shafts of a drive motor gearbox that provides drive motor force to rotate the screw shafts about their respective longitudinal axes in a timed relationship to apply shear forces to raw materials and thereby form a finished product, and each of the drive couplings having a screw shaft open end portion and an interior with internal splines, each of the screw shafts having a free end portion and external splines, the external splines of each screw shaft being angularly spaced apart around the longitudinal axis to interlock, at locations proximal to the free end portion of the screw shaft, with internal splines of a drive coupling for operatively coupling the screw shaft to an output shaft that provides the drive motor force to rotate the screw shaft according to the timed relationship, the timed relationship being indicated by a first fiducial showing a drive coupling rotational position and a second fiducial showing a screw shaft rotational position, an axially aligned pair of free end and screw shaft open end portions including an alignment device on one of a free end and screw shaft open end portions and a keyway section in the other of the free end and screw shaft open end portions, the alignment device having an alignment key including a tapered front face and first and second tapered side faces, the method comprising:

causing the output shafts of the drive motor gearbox to rotate the drive coupling rotational position until the first fiducial indicates the drive coupling rotational position is in a desired initial rotational position;

setting the intermeshed screws to an initial insertion position at least partly external to the multiple screw extruder, the initial insertion position defined by the longitudinal axes of the screw shafts being in a nominal coaxial alignment with those of the drive couplings and by the second fiducial indicating the screw shafts are in a nominal rotational alignment with the desired initial rotational position; and simultaneously moving the intermeshed screws from the initial insertion position and though a barrel of the multiple screw extruder for simultaneous insertion of the free end portions of the screw shafts into the screw shaft open end portions, the moving through the barrel causing a deviation from the nominal coaxial and rotational alignments, and the simultaneous insertion causing correction of the deviation when the tapered front faces of the alignment keys incrementally adjust the nominal coaxial alignment and the tapered side faces of the alignment keys incrementally adjust the desired initial rotational position cooperatively to guide the alignment keys to fit within associated ones of the keyway sections while providing alignment of the external splines on the screw shaft to interlock in the timed relationship with the internal splines during the simultaneous insertion.

17. The method of claim 16, further comprising: for each axially aligned pair, mating the respective alignment device onto the one of the free end and screw shaft open end portions.

18. The method of claim 17, in which the mating of the respective alignment device comprises fastening an alignment collar onto a screw shaft open end portion of the respective drive coupling.

19. The method of claim 17, in which the mating of the respective alignment device comprises fastening an alignment puck onto a free end portion of the respective screw shaft.

20. The method of claim 18, in which the first fiducial is located in or on a portion of a circumferential exterior surface of the alignment collar.

21. The method of claim 19, in which the second fiducial is located in or on a portion of a circumferential exterior surface of the alignment puck.

22. The method of claim 19, in which the keyway section comprises a blind internal spline of the respective drive coupling.

23. The method of claim 16, in which the first fiducial is located in or on a portion of a circumferential exterior surface of the respective drive coupling.

24. The method of claim 16, in which the second fiducial is a missing external spline of the respective screw shaft.

* * * * *